United States Patent [19]

Wiggins et al.

[11] 4,040,991

[45] Aug. 9, 1977

[54] POLYURETHANE FOAM RECONSTITUTION

[75] Inventors: Edwin W. Wiggins, Bridgeton; James F. Carpenter, St. Louis County, both of Mo.

[73] Assignee: McDonnell Douglas Corporation, St. Louis, Mo.

[21] Appl. No.: 423,152

[22] Filed: Dec. 10, 1973

[51] Int. Cl.² ................... C08G 18/14; B64C 3/34
[52] U.S. Cl. ................... 260/2.5 BD; 260/2.5 AD; 260/2.3; 53/111 RC; 427/140; 427/235; 427/239; 427/400
[58] Field of Search ........... 260/2.3, 2.5 BD, 2.5 AD; 117/98, 62.1, 138.8 D; 427/140, 235, 239, 400; 53/111 RC

[56] References Cited

U.S. PATENT DOCUMENTS

| | | | |
|---|---|---|---|
| 2,729,618 | 1/1956 | Müller | 260/2.3 |
| 2,955,056 | 10/1960 | Knox | 117/138.8 D |
| 3,050,414 | 8/1962 | Reilly | 117/138.8 D |
| 3,171,826 | 3/1965 | Volz | 260/2.5 R |
| 3,193,426 | 7/1965 | Schafer | 117/138.8 D |
| 3,193,441 | 7/1965 | Schafer | 117/138.8 D |
| 3,298,857 | 1/1967 | Terry | 260/2.5 BD |
| 3,326,861 | 6/1967 | Sandridge | 260/203 |
| 3,475,383 | 10/1969 | Stewart | 161/405 |
| 3,616,189 | 10/1971 | Harr | 161/405 |
| 3,738,946 | 6/1973 | Frulla | 260/2.3 |
| 3,752,695 | 8/1973 | Finelli | 117/138.8 D |

OTHER PUBLICATIONS

Lee & Neville, Epoxy Resins, McGraw-Hill, NY 1957, p. 8.

*Primary Examiner*—C. Warren Ivy
*Attorney, Agent, or Firm*—Gravely, Lieder & Woodruff

[57] ABSTRACT

This application describes a method of rejuvenating reticulated polyurethane materials, particularly those containing ester-type linkages which have been hydrolyzed after being exposed to moisture containing hydrocarbon fuel and/or highly humid environments. The process consists of treating the polyurethane with crosslinking compounds, such as diisocyanates and polyfunctional epoxy compounds.

7 Claims, No Drawings

POLYURETHANE FOAM RECONSTITUTION

BACKGROUND OF THE INVENTION

Polyurethane materials containing ester-type linkages are particularly vulnerable to hydrolysis. The action known as hydrolysis results in cleavages of a portion of the chemical bonds of the polyurethane producing a polymer of low average molecular weight and/or reduced cross-linkage. This also results in liquification of the polymer, a process known as reversion. Reticulated polyurethane foam, which is used in aircraft fuel tanks to eliminate or attenuate explosions, is subject to this reversion action and therefore requires periodic removal and replacement. This is an expensive practice, particularly when the tanks are welded closed.

Water in the fuel, from a humid environment in the ullage, acts on the exposed polyurethane foam in the fuel tank and cleaves the ester linkage. Some of the material resulting from the degradation of the polyurethane subsequently turns to a liquid which, when mixed with the hydrocarbon fuel, can cause engine damage.

The problem of polyurethane breakdown also occurs in polyurethane potting compounds used with electrical connectors. The potting compounds are used to seal the connectors to contacts in an insulator block. The surface of the potting compound is exposed to moisture and tends to react with the moisture and degrade.

This invention is suitable for use with polyester and polyether forms of polyurethanes. However, it is specifically applicable to the ester-type because this linkage is the most susceptible to hydrolysis and breakdown. The polyethers generally have greater inherent stability.

The present invention involves a chemical process whereby a diisocyanate or polyfunctional epoxy compound is reacted with the polyurethane and introduced into the structure of the molecule. The additive is a cross-linking type material and may serve to reconnect the portion of the molecule cleaved during hydrolysis. The principal advantage of the process is that the useful properties of the polyurethane foam material aare restored or modified in situ.

By means of this process partially hydrolyzed or reverted foam can be reconstituted in the fuel tank, without the difficult and time consuming removal of the foam heretofore necessary.

In addition, this process allows the chemical properties of the foam to be altered and tailored after it is manufactured and prior to its installation. That is, the process can be used to restructure the polyurethane material afteer is is made into reticulated form.

This process allows the physical properties of the foam to be altered and tailored to improve the hydrolytic stability at any convenient time during the life time of the foam. For example, the treatment to reconstitute the foam can be scheduled as a routine operation to be carried out during a regular aircraft overhaul and repair period.

These and other objects and advantages will become apparent hereinafter.

SUMMARY OF THE INVENTION

The present invention comprises a process for reconstitution and rejuvenation of polyurethane materials containing ester-type linkages in situ. The present invention further comprises treating the polyurethane material with cross-linking compounds such as diisocyanates and polyfunctional epoxy compounds to form chemical bonds with the polyurethane.

DETAILED DISCLOSURE

This invention is specifically directed to a reticulated polyurethane foamed structure. Reticulated polyurethane is made according to a process which involves a conventional foaming of polyurethane followed by a breakdown of the closed cells to produce a completely open cell or open pore structure. This can be done by a chemical leaching process using caustic or a burnout in a controlled atmosphere. These methods are well-known in the art and form no part of this invention.

The use of reticulated foam in fuel tanks likewise is well-known in the art and is specified in Air Force specifictions. This too forms no part of this invention.

This invention is concerned with the treatment of reticulated polyester-type polyurethane with a diisocyanate or a polyfunctional epoxy compound to attach the reactant to the urethane and thus give the characteristics of the reactant to the polyurethane structure. As the reactants are polyfunctional, the portions of the original polyurethane cleaved by hydrolysis may also be reattached.

Moisture in ullage is primarily responsible for the hydrolysis of the polyester polyurethane, but the polyurethane may also be attacked by water in the fuel.

The polyurethane being attacked by water is shown as follows:

$$\sim R_1-\overset{O}{\underset{\|}{C}}-O-R_2 \sim + H_2O \rightleftharpoons R_1-\overset{O}{\underset{\|}{C}}-OH + HOR_2 \sim$$

Polyester Polyurethane (showing ester linkage)     Carboxylate     Alcohol

The $R_1$ and $R_2$ groups are unimportant to this invention and can be varied depending on the characteristics desired in the final foamed product. These compounds are well-known in the art. The ester linkage and it susceptibility to attack by water is the important characteristic of the polyurethane molecule for purposes of this invention.

Hydrolysis of the ester linkage of the polyurethane can be counteracted by introducing new cross-linking compounds, such as, diisocyanates and polyfunctional epoxy compounds into the polyurethane molecule. The partially reverted (hydrolyzed) urethane compound is rejuvenated by immersion in the reconstituting compound. Reconstitution by diisocyanate (reattachment of the cleaved ester bond) is shown as follows:

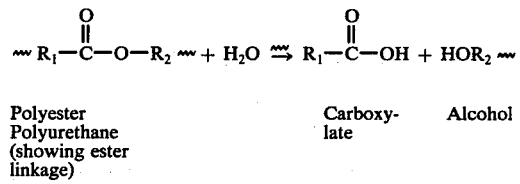

Carboxylate     Diisocyanate     Alcohol

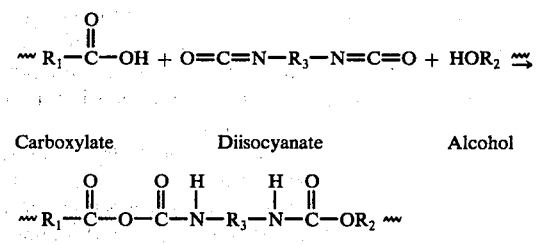

Reconstituted Polyurethane Linkage $R_1$, $R_2$ and $R_3$ are conventional radicals well-known in the art.

Among the diisocyanates suitable for use in this invention are the following: toluene diisocyanate, hexamethylene diisocyanate, diphenylmethane diisocyanate, isophorone diisocyanate, and trimethylhexamethylene diisocyanate. These materials may be pumped into the tanks containing the reticulated foam or may be added to the fuel as a flush or permanent additive. In either situation the diisocyanate will react to reconstitute the foam. The diisocyanate added to the polyurethane by this process does not have to be the same type as is already in the polymer. In fact, different properties can be obtained in the polyurethane depending on the type of diisocyanate or epoxy used to treat the foam.

Reconstitution can be performed by polyfunctional epoxy compounds such as the following: diglycidyl ether of bis(4-hydroxyphenyl)dimethylmethane, polyglycidyl ether of tetraphenylene ethane, tetraglycidyl methylene dianiline,bis bis (epoxy) cyclo pentyl) ether, tetra(p-glycidyloxyphenyl) ethane, and triglycidyl p-aminophenol. The reconstitution of polyurethane using polyfunctional epoxy compound is shown as follows:

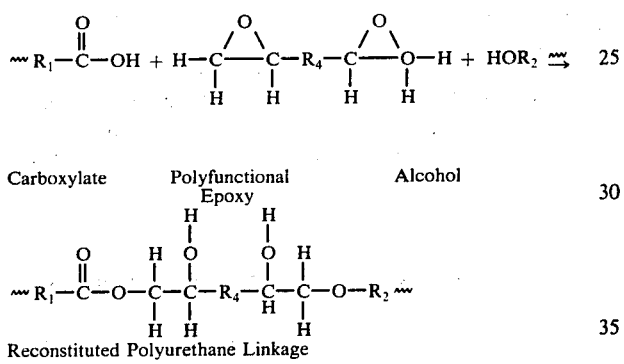

Again, $R_1$, $R_2$ and $R_4$ form no part of this invention.

The stabilization and reconstitution agents can be added to the fuel tanks that have already had partial degradation of the reticulated polyurethane while the engines are running. The reconstitution agents can be flushed through the tanks with the fuel or some other solvent, such as iso-octane or hexane.

When the polyurethane is restructured before use, the stabilizing cross-linking agent can be chosen so as to make the reticulated material stronger, harder, more resistant to hydrolysis and high temperatures, etc.

This stabilizing and cross-linking process can be used with polyether as well as polyester polyurethane.

Other uses of this invention are the alteration of the chemical and/or physical properties of polyurethane foam materials. Improved hydrolytic stability, tensile and compressive strengths, etc., can be obtained using this process.

The changes and degree of change for these properties is controlled by the selection of the polyfunctional cross-linking agent, the concentration, time and temperatures used in processing and the degree of sensitizing of the polymer by hydrolytic cleavage.

The reticulated polyurethane has a porosity of about 10 PPI (pores per lineal inch) to about 100 PPI, a density of about 1 lb./ft.$^3$ to about 5 lb./ft.$^3$, and a specific gravity of about 0.016 to about 0.08. Other physical and chemical characteristics include the following: tensile strength of about 15 psi minimum, a minimum ultimate elongation of about 205%, and the fluid displacement does not exceed about 3%.

The process can be used at a temperature of about 50 to about 110° F. and a concentration of cross-linking agent to reticulated polyurethane of about 0.25% to about 20%. The time of treatment is about 1 minute to about 5 to about 8 hours.

Specific detailed examples of this invention follow:

EXAMPLE NO. I

Moisture is drained by gravity from the sump areas in an aircraft fuel system.

About 0.38 ±0.10% v/v hexamethylene diisocyanate is added to Jet-A fuel. The modified fuel is pumped into the tanks of the aircraft which contain polyester-type polyurethane. After the tanks are filled, the aircraft is allowed to stand under ambient conditions for about 8 to about 16 hours. The modified fuel is drained from the tanks and stored for reuse. Health and safety precautions pertinent to the handling of diisocyanate compounds are observed at all times when following the foregoing procedure.

The urethane foam is rejuvenated by this process. Cleaved ester bonds in the foam structure are reattached by this reconstitution process.

EXAMPLE NO. II

The polyurethane foam can be reconstituted in an efficient labor-saving technique.

The method of Example No. I is followed, but instead of draining the modified fuel from the tanks, it is burned during flight.

The exact concentration and exposure times for the modified fuel are based on the degree of reversion exhibited by the reticulated foam. The degree of reversion relates to the number of active sites or areas of cleaved ester linkages that can react with the reconstitution agent. The reconstituted foam material has physiochemical properties quite different from the original foam. It has improved hydrolytic stability, chemical resistance and higher or lower strength properties.

EXAMPLE NO. III

The restructuring of manufactured foam to improve the hydrolytic stability can be done before it is installed in a fuel tank. This is accomplished in one of several methods depending on the physio-chemical properties desired.

One method comprises the immersion of the urethane foam in a solvent such as a saturated hydrocarbon containing the reconstituting compound. The reconstitution agent can be either a diisocyanate or polyfunctional epoxy compound in the concentration of about 10% to about 20% and is exposed to the urethane from about 0.5 to about 2 hours. In one specific example, tetraglycidyl methylene dianiline in a concentration of 15% v/v is added to the solvent. The urethane foam is then immersed in the solvent mixture for 1 hour at a temperature of about 75° to 100° F. to improve its hydrolytic stability before it is installed in a fuel tank.

EXAMPLE NO. IV

Another method of improving the hydrolysis stability of urethane foam is to treat the foam with steam while maintaining the foam at a temperature of about 215° F. to about 230° F. for about 15 to about 60 hours to initiate a predetermined degree of hydrolytic bond cleavage. The steam treated foam is treated with a reconstitution agent as in Example No. III to produce a foam of improved hydrolytic stability. Steam autoclave techniques may be used to reduce the treatment time. That is, steam autoclaving at about 280° F. will reduce the time of steam treatment to about 3 to about 12 hours. The temperature of the foam must be kept below about 300° F. to avoid thermal degradation of the foam.

The degree of hydrolytic bond cleavage is essentially the same as the degree of reversion. The predetermined degree of hydrolytic bond cleavage is a result of controlled conditions such that the number of active sites in the urethane foam is controlled. Methods of reaching a predetermined degree of hydrolytic bond cleavage include varying the time of exposure and temperature of the steam treatment. The extent of this treatment can be determined by simple measurement of physio-chemical properties, for example, tensile strength. A certain reduction in tensile strength can be determined as a control point in the process. Subsequently, products with varying properties in relation to the control point may be produced as shown by the following example.

EXAMPLE NO. V

Polyurethane foam exposed to steam (212° F.) for 48 hours shows a reduction in tensile strength of 50-60%. Reconstitution with hexamethylene diisocyanate in JP-4 fuel and with diisocyanate in hexane at a concentration of 0.25% v/v for 6-8 hours resulted in 90% recovery of the initial tensile strength. Subsequent exposure to high humidity shows improved hydrolytic stability.

EXAMPLE NO. VI

In the following table, Table No. 1, are results of tests of various methods of polyurethane foam reconstitution using the concepts of this invention. In constructing Table No. 1, the reversions were carried out at 200° F, and at 100% relatively humidity. The reconstitutions were accomplished using hexamethylene diisocyanate (HMDI) dissolved in hexane (HEX) or jet fuel (JP-4). After treating for the specified time in the solution, the foam was rinsed with the carrier, i.e., hexane or JP-4. The tensile strength of specimen Nos. 10-27 is an average of about 2.5 psi. In viewing Table No. 1, the following discussion should be kept in mind.

Specimens 1, 2 and 3 were controls to determine the initial tensile strength.

Specimens 4 and 5 were treated prior to hydrolysis. When these specimens were subsequently subjected to reversion conditions and compared to non-treated specimens 6 and 7 also subjected to the same reversion conditions, no significant difference was found.

Specimens 8 and 9 were control specimens to determine the average degree of reversion of the remaining specimens 10 through 27. All of these specimens were subjected to 200° F., 100% relative humidity for 96 hours. Ninety percent reversion as indicated by tensile strength was obtained. Groups of two of these specimens were treated in various HMDT/JP-4 or HMDT/HEX solutions for various times ranging from 1/2 to 23 hours at room temperature. All specimens with the exception of 14, 15 and 20, 21 were tensile tested at this point. The remaining pairs were subjected to reversion conditions for 72 hours at 200° F. and 100% relative humidity, and then tested.

TABLE NO. 1

RETICULATED POLYURETHANE FOAM RECONSTITUTION

| Specimen #'S | Reversion (Time Hrs) | Tensile (Psi) | Reconstitution %HMDI | Fluid | (Hrs.) | Tensile (Psi) | Reversion Time (Hrs) | Tensile Psi |
|---|---|---|---|---|---|---|---|---|
| 1,2,3 | 0 | 25.5 | — | — | — | — | — | — |
| 4,5 | 0 | — | 1.0 | JP-4 | 4 | — | 72 | 16.8 |
| 6,7 | 72 | 16.2 | — | — | — | — | — | — |
| 8,9 | 96 | 2.5 | — | — | — | — | — | — |
| 10,11 | 96 | — | 1.0 | Hex | ½ | 7.7 | — | — |
| 12-15 | 96 | — | 1.0 | Hex | 23 | 13.4 | 72 | 5.8 |
| 16,17 | 96 | — | 1.0 | JP-4 | ½ | 7.3 | — | — |
| 18-21 | 96 | — | 1.0 | JP-4 | 4 | 14.5 | 72 | 2.5 |
| 22-23 | 96 | — | ½ | JP-4 | 1 | 7.3 | — | — |
| 24-25 | 96 | — | ½ | JP-4 | 4 | 12.5 | — | — |
| 26-27 | 96 | — | ½ | JP-4 | 4 | 9.3 | — | — |

This invention is intended to cover all changes and modifications of the example of the invention herein chosen for purposes of the disclosure which do not constitute departures from the spirit and scope of the invention.

What is claimed is:

1. The process of treating reticulated polyester urethane foam materials positioned in a fuel tank, said foam containing molecular linkages which have undergone hydrolysis and partial reversion comprising passing a reconstitution diisocyanate or polyfunctional epoxy compound through the fuel tank, and contacting the hydrolyzed polyurethane foam with said reconstitution material to produce a reconstituted foam structure in situ.

2. The process of c;aim 1 including the step of attaching the cleaved portions of the polyurethane through the diisocyanate or polyfunctional epoxy material.

3. The process of claim 1 wherein the reconstituting materials are combined with fuel and the mixture is placed in the fuel tank to reconstitute the foam.

4. The process of claim 1 wherein the concentration of diisocyanate or polyfunctional epoxy compound to reticulated polyurethane is about 0.25% to about 5%.

5. The process of claim 1 wherein the foam is treated with the reconstituting material at a temperature of about 50 to about 100° F for about 1 to about 10 hours.

6. The process of claim 1 wherein the diisocyanate is selected from a group consisting of toluene diisocyanate, hexamethylene diisocyanate, diphenylmethane diisocyanate, isophorone diisocyanate, trimethylhexamethylene diisocyanate, and mixtures thereof.

7. The process of treating reticulated polyurethane foam materials positioned in a fuel tank, said foam containing ester linkages which have undergone hydrolysis and partial reversion comprising treating the hydrolyzed polyurethane material in the fuel tank with a polyfunctional epoxy compound selected from a group consisting of diglycidyl ether of bis(4-hydroxyphenyl)-dimethylmethane, polyglycidyl ether of tetraphenylene ethane, tetraglycidyl methylene dianiline, bis (epoxy cyclo pentyl) ether, tetra (p-glycidyloxyphenyl) ethane, triglycidyl p-aminophenol, and mixtures thereof, and forming a reconstituted foam structure in situ.

* * * * *